United States Patent [19]

Hamaekers

[11] Patent Number: 5,320,332
[45] Date of Patent: Jun. 14, 1994

[54] VIBRATION DAMPER WITH AXIAL CAPS AND DIAPHRAGM-EDGE AREAS

[75] Inventor: Arno Hamaekers, Gorxheimertal, Fed. Rep. of Germany

[73] Assignee: Firma Carl Freudenberg, Weinheim, Fed. Rep. of Germany

[21] Appl. No.: 973,464

[22] Filed: Nov. 9, 1992

[30] Foreign Application Priority Data

Nov. 19, 1991 [DE] Fed. Rep. of Germany ....... 4137977

[51] Int. Cl.$^5$ .............................................. F16F 13/00
[52] U.S. Cl. ................................ 267/140.12; 267/219; 248/562
[58] Field of Search ............... 267/140.11, 140.12, 267/140.3, 140.4, 141, 141.1, 141.2, 141.4, 219, 220; 248/562, 636, 638; 180/300, 312, 902

[56] References Cited

U.S. PATENT DOCUMENTS

| 4,568,069 | 2/1986 | Poupard | 248/562 X |
| 4,871,152 | 10/1989 | Funahashi | 248/562 X |
| 4,936,555 | 6/1990 | Ishiyama et al. | 267/219 X |
| 5,184,803 | 2/1993 | Tanabe et al. | 267/140.12 |

FOREIGN PATENT DOCUMENTS

| 0326504 | 8/1989 | Fed. Rep. of Germany . | |
| 0208650 | 10/1985 | Japan | 267/219 |
| 0214531 | 9/1988 | Japan | 248/562 |
| 1126451 | 5/1989 | Japan | 267/140.12 |

Primary Examiner—Robert J. Oberleitner
Assistant Examiner—Josie A. Ballato
Attorney, Agent, or Firm—Kenyon & Kenyon

[57] ABSTRACT

A hydraulically damped multi-chamber hydraulic bushing is disclosed, which is capable of being loaded perpendicular to its axis. The bushing comprises two supporting sleeves which surround one another and are braced against each other by way of at least one spring element of an elastic material. The spring element at least partially surrounds the inner supporting sleeve, and at least two chambers—which are filled with an incompressible fluid—are arranged diametrically opposite one another. The chambers are fluidly interconnected through at least one connecting port. The chambers are formed by the outer supporting sleeve and a movable chamber wall that is turned toward the inner supporting sleeve. Each chamber wall has a central area that is resistant to expansion and an edge area with a rolling-diaphragm-type design, and is formed in one piece with the spring element. During use, the central areas and the inner supporting sleeve define a gap, which extends in the axial direction and has a maximum radial width of 1 mm.

9 Claims, 5 Drawing Sheets

VIBRATION DAMPER WITH AXIAL CAPS AND DIAPHRAGM-EDGE AREAS

BACKGROUND OF THE INVENTION

1. Field of the Invention

The present invention relates to a hydraulically damped multi-chamber hydraulic bushing, which is capable of being loaded perpendicular to its axial direction. The bushing comprises two supporting sleeves, one surrounding the other. The sleeves are braced against each other by means of at least one spring element of an elastic material, whereby the spring element partially surrounds the inner supporting sleeve, and whereby the outer supporting sleeve and the spring element define at least two diametrically opposed chambers. The chambers are arranged perpendicular to the axial direction, are filled with an incompressible fluid, and are fluidly interconnected through at least one connecting port.

2. Description of the Related Art

European Published Patent Application 0 326 504 discloses a hydraulic bushing. The hydraulic bushing in this patent is formed with a plurality of fluid-filled chambers, which are fluidly interconnected through a passage. In this bushing, however, the insulation of high-frequency, small-amplitude vibrations is not satisfactory because of the small isolation surface necessitated by the type of construction used. Moreover, because the supporting body contacts the fluid over a large surface, high-frequency vibrations are transmitted to the fluid and lead to vorticity and to an increase in the dynamic spring rate. Furthermore, this hydraulic bushing has a comparatively complicated construction and consists of many individual parts, so that many separate operations are required during assembly. In this bushing the damping of low-frequency vibrations is also not very satisfactory. Finally, dissimilar pump conditions occur in the working chambers and as a result, the volume increase must be taken up in the chamber walls, causing them to expand. Thus, the output volume and attainable damping are adversely affected.

SUMMARY OF THE INVENTION

The object of the present invention is to avoid the previously mentioned disadvantages, particularly the transmission of small-amplitude, high-frequency vibrations when lower frequency vibrations are damped during normal operation. Moreover, the aim of the present invention is to improve the insulation of small-amplitude and the damping of large-amplitude vibrations, as well as to allow simple and economical construction of the bushing.

The present invention provides chambers in the hydraulic bushing which are formed by the outer supporting sleeve and a movable chamber wall that is turned toward the inner supporting sleeve. The chamber walls have a central area that is resistant to expansion and an edge area with a rolling-diaphragm-type design. The chamber walls are formed in one piece with the spring element. During operation, the central areas and the inner supporting sleeve define a gap which extends in the axial direction and has a maximum radial width of 1 mm. This feature necessitates that the elastic spring element be decoupled—in the case of small amplitude, which arise in the gap—from the hydraulic damping chambers. The chambers have a vibrations symmetrical construction and are fluidly interconnected via a connecting port. The chamber walls are designed to be resistant to expansion and have a central area and an edge area which are dimensioned so that they are not subjected to tensile load during maximum spring deflection or rebound travel. This feature results in an isolated hydraulic bushing, which enables the spring rate, damping, and fatigue strength to be optimized seperately, and which is requires few parts and is easy to assemble. Highly effective damping can be achieved with the hydraulic bushing of the present invention, and cavitation inside the bushing is avoided by means of a vacuum-free, symmetrical, multi-chamber damping system. The hydraulic bushing consists of only three metal parts—an inner supporting sleeve, a ring bearing with recesses and an outer supporting sleeve—and the spring element and outer supporting sleeve are connected without axial prestress. Furthermore, it is advantageous that the chamber walls consist of an elastic material and do not result in any disturbing noises when the inner supporting sleeve or the outer supporting sleeve are hit.

In order for the liquid-filled chambers to damp low-frequency, large-amplitude vibrations, they are substantially symmetrical and are interconnected via a connecting port. The port has a duct-type shape and is located in the vicinity of the outer supporting sleeve. The connecting port is designed to allow the liquid volume to oscillate in phase opposition to low-frequency vibrations, so that damping of these vibrations is achieved.

To insulate higher frequency, small-amplitude vibrations, the edge areas of the chamber walls have a rolling-diaphragm-type design so that tensile loads not to occur in these areas during use. Good mobility of the chamber walls insulates higher frequency vibrations and as a result, the hydraulic bushing according to the present invention has a long service life.

To achieve smoother damping operation and to avoid impact noises, each of the central areas can be provided, on the side facing the fluid, with at least one limit stop and/or at least one damping device. The damping devices can be formed by recesses within the central areas. During maximum spring deflection or rebound travel—when the central areas approach the outer pipe—the cushioning action causes the fluid to be delivered out of the recesses into the adjoining chambers. The recesses can vary in design depending upon the conditions to which the bushing will be subjected. In the present invention, the central areas has both limit stops as well as damping devices.

Another refinement of the present invention is for at least one of the fluid-filled chambers to be fluidly connected to a compensation chamber, for the connection between the chambers to be formed by a bypass, and for the size ratio of the bypass cross-section to restrictor duct cross-section range between 1:5 to 1:100. The compensation chamber is provided to quasistatically accommodate changes in fluid volume that result because of temperature and/or assembly fluctuations. The compensation chamber is connected via a bypass to the hydraulic system. The compensation chamber is also defined by a chamber wall which allows the accommodation of volume changes caused by incremental changes in pressure. The result is that an increase in the dynamic spring rate is reliably avoided.

Another refinement is for the central areas to be rigidly connected to one another in the radial direction, by means of a mechanical connection. It is advantageous in this embodiment if the sum of the width of the two gaps between the central areas and the inner supporting sleeve is kept constant, ensuring a decoupling of small-amplitude vibrations from the damping part of the bearing.

The inner supporting sleeve and the central areas can be connected to the spring element by spacer segments. The spacer segments are configured between the inner supporting sleeve and the expansion-resistant central area of the chamber walls. The length of the segments is dimensioned so that after shrinkage resulting during manufacturing, a clearance sets in between the mutually facing surfaces of the chamber wall and the elastic spring element.

The subject matter of the present invention is clarified in greater detail in the drawings. In a partial, schematic representation, the drawings depict the individual components of the present invention:

DESCRIPTION OF THE PREFERRED EMBODIMENTS

Figure 1:
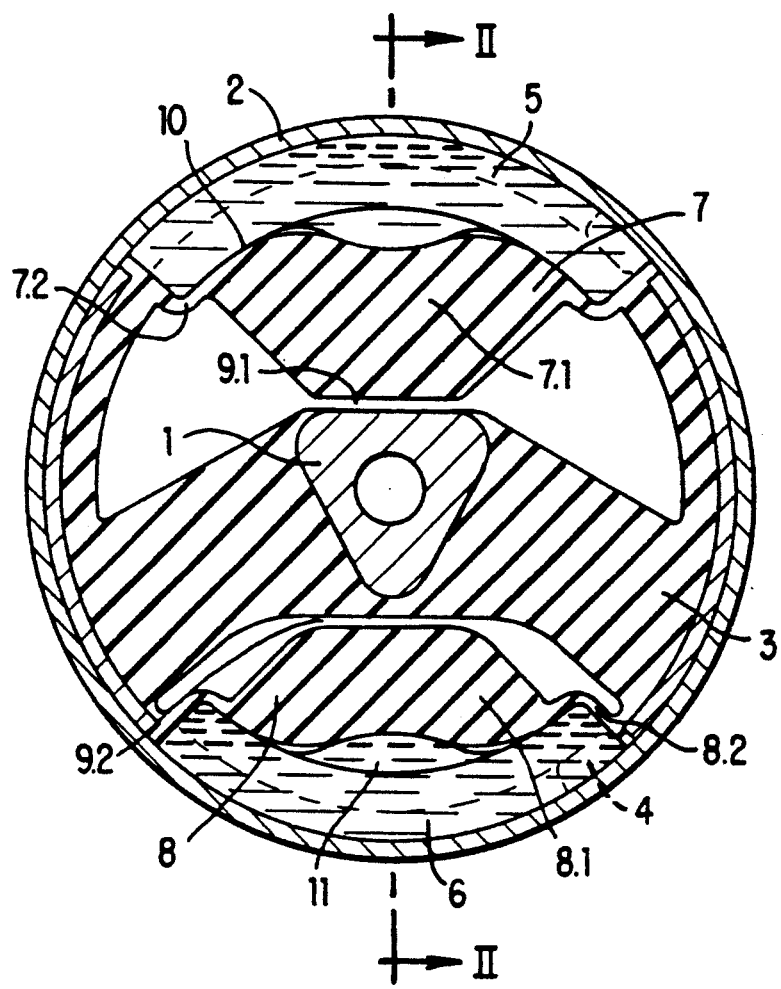
FIG. 1 illustrates an example of an isolated hydraulic bushing according to the invention in a cross-sectional representation.

FIGS. 1 through 5 each show a two-chamber hydraulic bushing, which is capable of being loaded in a direction which is essentially perpendicular to its axis. The outer supporting sleeve 2 surrounds the inner supporting sleeve 1, whereby the two supporting sleeves 1, 2 are connected to each other by means of an elastic spring element 3. The hydraulic bushings depicted here essentially have four chambers. The chambers which are located to the outside in the radial direction are liquid-filled and are fluidly interconnected by means of a duct-shaped connecting port 4. To damp low-frequency, large-amplitude vibrations, the liquid contained in the damping duct oscillates between the chambers 5, 6 with a resonance that is in phase opposition to the low-frequency vibration. A damping action results from this fluid oscillation. The chambers which lie to the inside in the radial direction have open end walls and are not filled with liquid. The chamber walls 7, 8 which seperate the liquid-filled chambers from the air-filled chambers are designed to have an expansion-resistant central areas 7.1, 8.1 and rolling-diaphragm-type edge areas 7.2, 8.2. The chamber walls 7, 8 are formed in one piece with the spring element 3. To insulate higher frequency, small-amplitude vibrations, a gap 9.1, 9.2 is provided between the central areas 7.1, 8.1 and the inner supporting sleeve 1. This gap 9.1, 9.2 extends in the axial direction and is 0.5 mm wide.

A first embodiment of the hydraulic bushing according to the present invention is shown in FIG. 1. The fluid-filled chambers 5, 6 are configured between the outer supporting sleeve 2 and the chamber walls 7, 8 and are fluidly interconnected via a restrictor duct 4. The restrictor duct 4 extends along the outer supporting sleeve 2. In this embodiment, the inner supporting sleeve 1 has a polygon-shaped cross-section. This simplifies the location of the inner supporting sleeve 1 on the elastic spring element 3. In the direction of the outer supporting sleeve 2, the central areas 7.1, 8.1 of the chamber walls 7, 8 have recesses in the form of damping devices 11, which become effective when there are extreme deflections of the inner supporting sleeve 1 relative to the outer supporting sleeve 2. As the central areas 7.1, 8.1 come closer to the outer supporting sleeve 2, the relative velocity of the two components towards each other decreases producing a cushioning effect. In this manner, impact noises can be reliably avoided. Concerning the feature of the membrane-type edge areas 7.2, 8.2, care must be taken to ensure that they are not subjected to tensile load. This refinement results in a considerably improved service life. As shown in FIG. 1, the central areas 7.1, 8.1 are curvilinearly cambered in cross-section.

Figure 2:
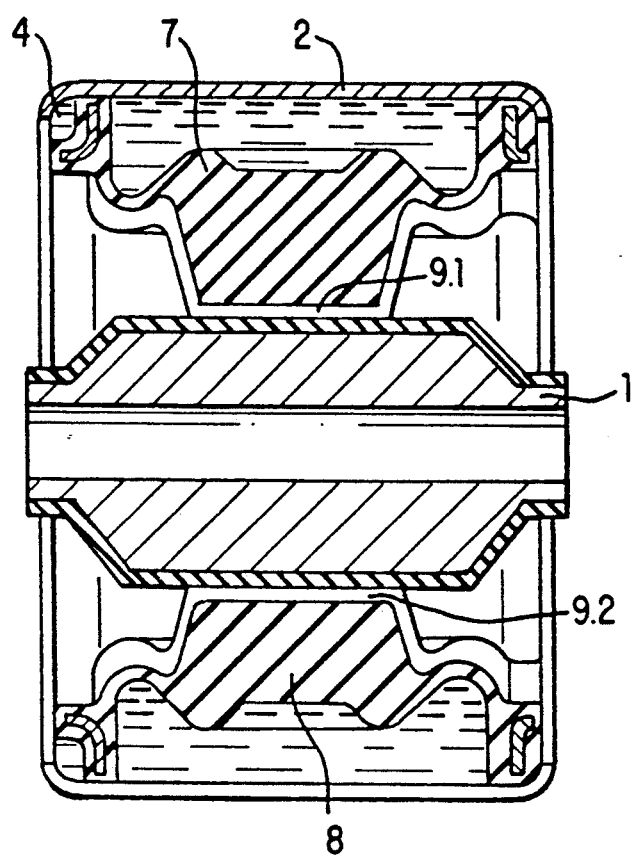
FIG. 2 shows a longitudinal cross-section of the hydraulic bushing of FIG. 1.

In FIG. 2, the hydraulic bushing shown in FIG. 1 is depicted in longitudinal cross-section. Both the damping devices 11—in the form of recesses within the central areas 7.1, 8.1—as well as the limit stops 10, can be easily recognized in this figure. The restrictor duct 4 extends in this embodiment between the outer supporting sleeve 2 and a duct-type recess within the elastic spring element 3. The liquid inside the fluid chambers 5, 6 usually consists of water with an antifreeze content.

Figure 3:
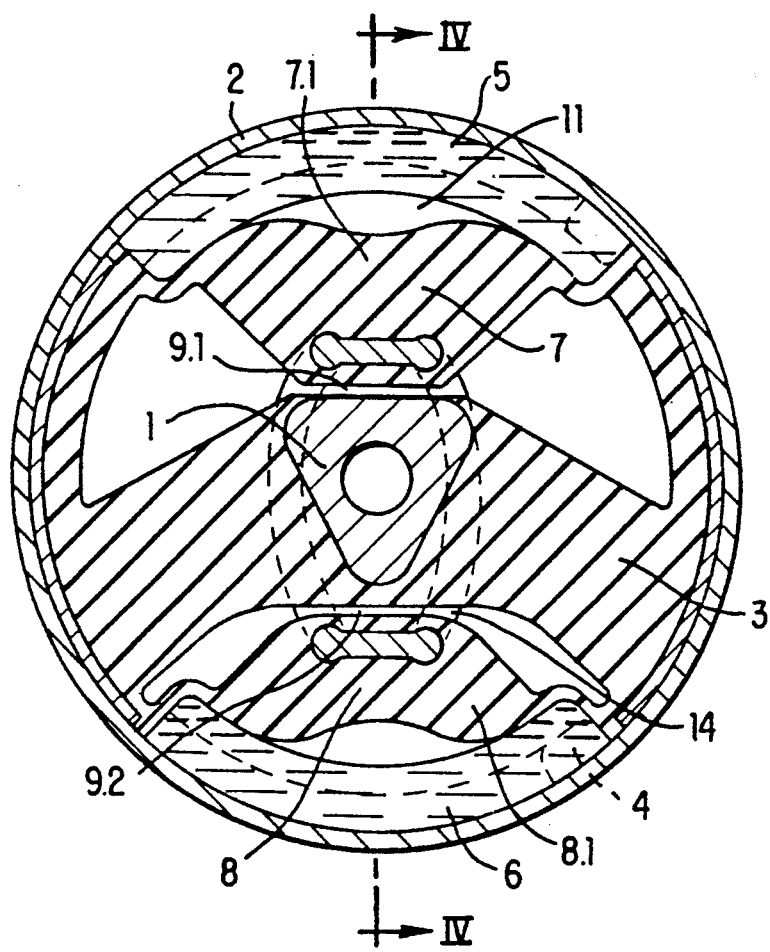
FIG. 3 depicts another refinement of the hydraulic bushing according to the invention in a cross-sectional representation, whereby the central areas are affixed to one another by means of a mechanical connection.
Figure 4:
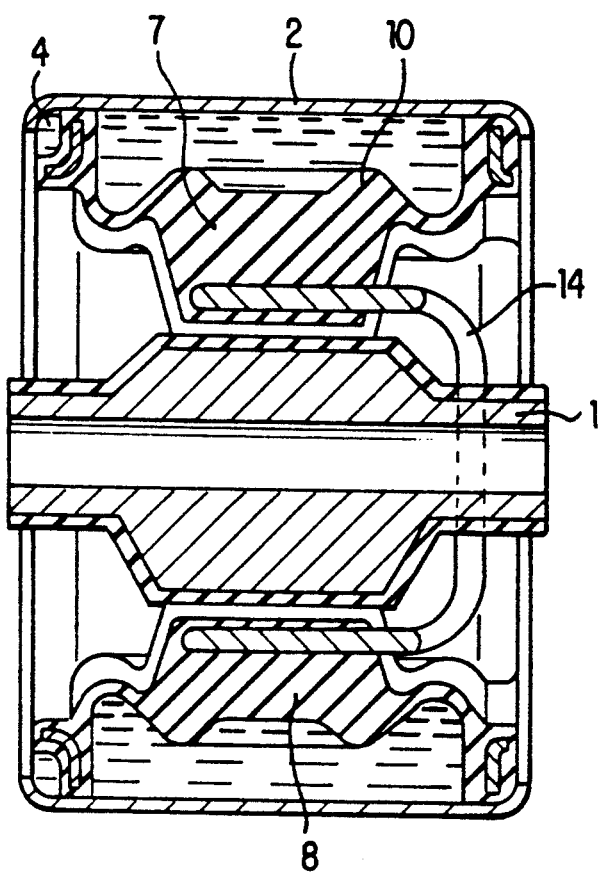
FIG. 4 shows the hydraulic bushing of FIG. 3 in a longitudinal cross-section.
Figure 5:
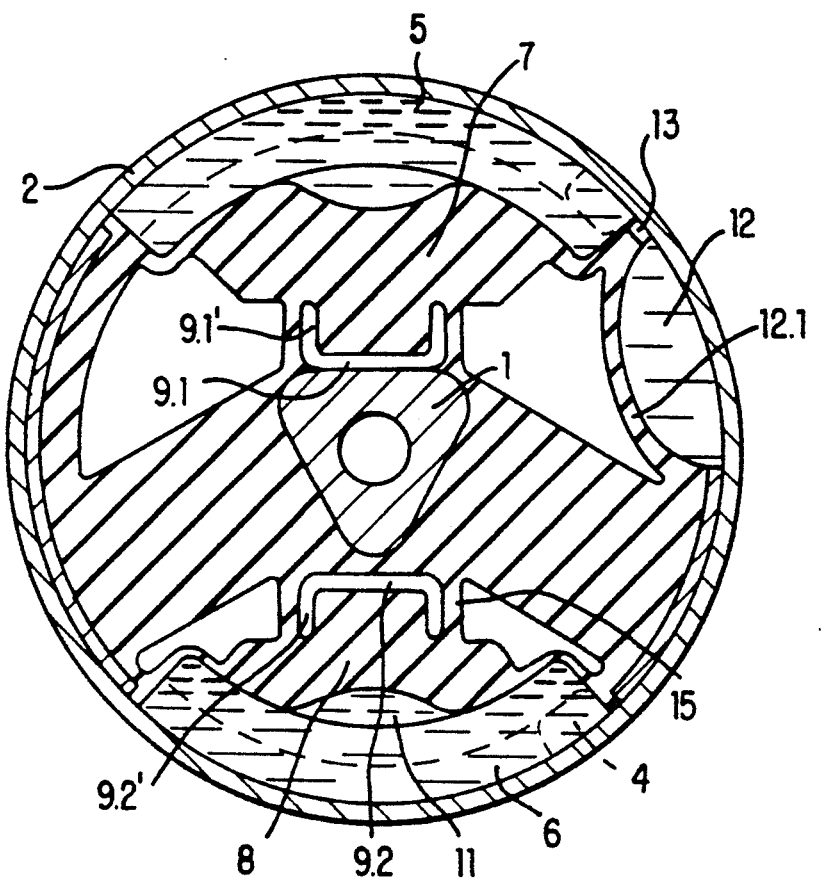
FIG. 5 illustrates another refinement of the hydraulic bushing according to the invention, whereby a compensation chamber is provided and the central areas of the chamber walls are directly connected to the elastic spring element surrounding the inner supporting body.

The hydraulic bushing shown in FIG. 3 essentially corresponds to the hydraulic bushing of FIG. 1, except that the central areas 7.1, 8.1 are immovably affixed to one another in the radial direction by means of a mechanical connection 14. This embodiment necessitates constant gaps 9.1, 9.2 between the central areas 7.1, 8.1 and the inner supporting sleeve 1 to effectively isolate small-amplitude, high-frequency vibrations of the inner sleeve from the damping part of the bearing. The mechanical connection 14 can be formed, for example, by a steel plate, which is vulcanized into the central areas 7.1, 8.1 and encircles the inner supporting sleeve 1, as shown in FIG. 4.

In contrast to the hydraulic bushings described above, the hydraulic bushing shown in FIG. 5 has a compensation chamber 12, which is fluidly connected to chambers 5, 6. The compensation chamber is connected to the liquid-filled chambers 5, 6 via a bypass 13, whose cross-section is substantially smaller than to the cross-section of the restrictor duct 4. The compensation wall 12.1 is capable of accommodating volume changes caused by incremental pressure increases, and it extends into an area of the air-filled chambers. As a result, manufacturing tolerances can be compensated for and the hydraulic bushing can operate in various temperature ranges. Moreover, the elastic spring element 3 is designed to insulate high-frequency vibrations by the provision of spacer segments 9.1', 9.2', including gaps 9.1, 9.2, which are configured between the elastic spring element 3 and the inflation-resistant central areas 7.1, 8.1. The length of the segments is dimensioned so that, after the occurrence of shrinkage caused by manufacturing, the required clearance sets of less than 1 mm in between the central areas 7.1, 8.1 and the inner supporting sleeve 1.

I claim:

1. A hydraulically damped bushing comprising:

an inner supporting sleeve and an outer supporting sleeve;

at least one elastic spring element connecting the inner supporting sleeve and the outer supporting sleeve, said spring element at least partially surrounding said inner supporting sleeve;

at least two fluid chambers filled with an incompressible fluid, said chambers being arranged opposite one another, and substantially perpendicular to an axis of said bushing, each said fluid chamber being formed by the outer supporting sleeve and a movable chamber wall adjacent the inner supporting sleeve, each said movable chamber wall having a central area that is resistant to expansion and a diaphragm-like edge area, each said movable chamber wall being formed in one piece with the spring element, said central areas and the portion of the spring element surrounding the inner supporting sleeve defining gaps which extend in the axial direction; and a connecting port interconnecting said two fluid chambers:

wherein at least one of the fluid chambers is connected to a compensation chamber by a bypass, and wherein a ratio of a cross-sectional area of the bypass to a cross-sectional area of the connecting port is between 1:5 and 1:100.

2. The hydraulic bushing according to claim 1, wherein:

said gaps have a maximum radial width of 1 mm.

3. The hydraulic bushing according to claim 2, wherein:

the spring element and the central areas are interconnected in an area of the inner supporting sleeve by spacer segments defining said gaps, said spacer segments providing said maximum radial width after shrinkage caused by manufacturing of said spring element.

4. The hydraulic busing according to claim 3, wherein:

said spacer segments have curvilinearly cambered cross-sections.

5. The hydraulic bushing according to claim 1, wherein:

the fluid-filled chambers are substantially symmetrical and the connecting port is adjacent the outer supporting sleeve.

6. The hydraulic bushing according to claim 1, wherein:

the edge areas are shaped to eliminate tensile loads.

7. The hydraulic bushing according to claim 1, wherein:

the compensation chamber is defined by a compensation chamber wall which expands in response to incremental changes in pressure in the compensation chamber.

8. The hydraulic bushing according to claim 1, wherein:

said central areas are fixedly connected to one another in the radial direction by means of a mechanical connection.

9. A hydraulically damped bushing comprising:

an inner supporting sleeve and an outer supporting sleeve;

at least one elastic spring element connecting the inner supporting sleeve and the outer supporting sleeve, said spring element at least partially surrounding said inner supporting sleeve;

at least two fluid chambers filled with an incompressible fluid, said chambers being arranged opposite one another, and substantially perpendicular to an axis of said bushing, each said fluid chamber being formed by the outer supporting sleeve and a movable chamber wall adjacent the inner supporting sleeve, each said movable chamber wall having a central area that is resistant to expansion and a diaphragm-like edge area, each said movable chamber wall being formed in one piece with the spring element, said central areas and the portion of the spring element surrounding the inner supporting sleeve defining gaps which extend in the axial direction; and a connecting port interconnecting said two fluid chambers;

wherein the central areas are provided with damping devices and wherein the damping devices are recesses within the central areas.

* * * * *

UNITED STATES PATENT AND TRADEMARK OFFICE
CERTIFICATE OF CORRECTION

PATENT NO. : 5,320,332
DATED : June 14, 1994
INVENTOR(S) : Arno Hamaekers

It is certified that error appears in the above-indentified patent and that said Letters Patent is hereby corrected as shown below:

| Column | Line | |
|---|---|---|
| 1 | 2 | Change "CAPS" to --GAPS--. |
| 4 | 64 | After "clearance" delete "sets"; after "1 mm" insert --sets--. |

Signed and Sealed this

First Day of November, 1994

BRUCE LEHMAN

Attest:

Attesting Officer

Commissioner of Patents and Trademarks